UNITED STATES PATENT OFFICE.

FRANK WHEATON, OF BROOKLYN, NEW YORK.

SEPARATION OF FIBER FROM THE COTTON-PLANT AND MANUFACTURE OF ARTICLES THEREFROM.

SPECIFICATION forming part of Letters Patent No. 254,749, dated March 7, 1882.

Application filed November 3, 1881. (No specimens.)

*To all whom it may concern:*

Be it known that I, FRANK WHEATON, of the city of Brooklyn, in the county of Kings and State of New York, have invented certain new and useful Improvements in the Separation of Fiber from the Cotton-Plant and the Manufacture of Articles therefrom, and for Wadding and otherwise, as hereinafter set forth; and I do hereby declare that the following is a full, clear, and exact description of the invention, which will enable others skilled in the art to which it appertains to make and use the same.

I take the stalks and branches in their green state, or after maturity, either with the roots or cutting off the stalks near the ground, and strip the leaves therefrom. Immediately thereafter, or so soon as possible, the stalks and branches are passed through rollers, in order to crush them, or retted in any of the ordinary ways of retting, so that the bark can be easily separated from the pith and woody or ligneous portions. I then take the bark in a dry state— *i. e.*, after drying it in the sun two or three hours, or in a house or inclosure for one day or more— and pass it through corrugated rollers, in order to scutch or brake the outer covering from its fibrous parts. Then by carding or hackling I get the fiber.

Having obtained the fiber in the way and manner as above specified and described, and prepared the same as set forth, I spin it into fabrics by the ordinary suitable machines in use for such work. I spin and make it into yarns, threads, twines, cordage, and ropes. Also, having prepared the fiber in the way and manner specified and described, I then use the same for wadding and for stuffing pillows, cushions, mattresses, chairs, sofas, and horse-collars, and for other padding, stuffing, and calking.

The advantages among others of this improvement are cheapness in cost, strength in quality, and great durability.

Having now fully described my invention, what I claim as new, and desire to secure by Letters Patent, is—

1. The separation of the fiber from the stalk of the cotton-plant and the spinning of the same, when prepared substantially as described, into fabrics, in the manner set forth.

2. Fabrics made by the spinning of the fiber of the stalk of the cotton-plant, when separated and prepared substantially as set forth, including twine, rope, cordage, and yarns, as well as threads.

3. Fiber separated from the stalk of the cotton-plant and prepared for wadding, stuffing, packing, and calking, substantially as set forth.

4. The fiber separated from the cotton-stalk and dried and prepared substantially as set forth, for wadding, stuffing, and calking.

In testimony that I claim the foregoing as my own I affix my signature in presence of two witnesses.

FRANK WHEATON.

Witnesses:
   JOHN C. KILBY,
   HOWARD C. CADY.